US006896038B2

(12) United States Patent
Arilla et al.

(10) Patent No.: US 6,896,038 B2
(45) Date of Patent: May 24, 2005

(54) STATOR RING VENTILATION ASSEMBLY

(75) Inventors: Jean-Baptiste Arilla, Soisy sur Seine (FR); Thierry Fachat, Moissy Cramayel (FR)

(73) Assignee: Snecma Moteurs, Paris (FR)

( * ) Notice: Subject to any disclaimer, the term of this patent is extended or adjusted under 35 U.S.C. 154(b) by 40 days.

(21) Appl. No.: 09/986,280

(22) Filed: Nov. 8, 2001

(65) Prior Publication Data

US 2002/0053837 A1 May 9, 2002

(30) Foreign Application Priority Data

Nov. 9, 2000 (FR) ........................................... 00 14373

(51) Int. Cl.[7] .......................... F03B 11/00; F03D 11/00

(52) U.S. Cl. ......................... 165/47; 60/39.83; 415/115

(58) Field of Search ......................... 165/47; 60/39.83; 415/115, 116, 177, 178; 416/95

(56) References Cited

U.S. PATENT DOCUMENTS 3,593,783 A * 7/1971 Muller et al. ............... 165/164
3,756,020 A * 9/1973 Moskowitz et al.
3,818,696 A * 6/1974 Beaufrere
4,279,123 A 7/1981 Griffin et al.
4,773,981 A * 9/1988 Bidwell
4,828,403 A * 5/1989 Schwartzman
4,972,921 A * 11/1990 Takada et al. .............. 181/282
5,100,291 A 3/1992 Glover
5,205,115 A * 4/1993 Plemmons et al.
5,273,396 A 12/1993 Albrecht et al.
5,399,066 A * 3/1995 Ritchie et al.
5,964,575 A * 10/1999 Marey ........................ 415/115
5,980,201 A * 11/1999 Benoist et al. .............. 415/115
6,575,697 B1 * 6/2003 Arilla et al. ............. 415/173.1
6,666,645 B1 * 12/2003 Arilla et al. ................ 415/116
6,726,446 B2 * 4/2004 Arilla et al. ................ 415/138
2003/0012651 A1 * 1/2003 Arilla et al. ................ 416/111

FOREIGN PATENT DOCUMENTS

DE 28 55 055 A1 * 6/1980
DE 100 26 355 A1 * 1/2002
FR 2831918 * 5/2003
WO 01/34946 A1 * 5/2001
WO 01/51771 A2 * 7/2001
WO 02/44526 A1 * 6/2002
WO 02/053876 A1 * 7/2002
WO 03/040524 A1 * 5/2003

* cited by examiner

*Primary Examiner*—Ljiljana Ciric
(74) *Attorney, Agent, or Firm*—Oblon, Spivak, McClelland, Maier & Neustadt, P.C.

(57) ABSTRACT

An assembly for ventilating a stator ring having branched pipes that include feed pipes, distributors, and a plurality of manifolds adjacent to the stator ring and provided with drilled holes. The distributors connect the feed pipes to the plurality of manifolds, and the plurality of manifolds include pairs of half-shells, each of the half-shells including an end plate having an opening and a rim surrounding the end plate, and the half-shells in each of the pairs being joined to each other at the rims. The distributors include ducts mounted between adjacent ones of the plurality of manifolds and have open ends fitted into openings of the end plates and have abutment portions to the end plates.

17 Claims, 4 Drawing Sheets

2-2

1-1

STATOR RING VENTILATION ASSEMBLY

BACKGROUND OF THE INVENTION

1. Field of the Invention

This description is applicable to a ventilation assembly for a stator ring designed to transport a gas at a given temperature to a turbomachine stator ring in order to adjust its diameter and the clearance between it and the ends of the rotor blades turning in it.

2. Discussion of the Background

This type of ventilation assembly is frequently used in turbojets and consists of pipes with several different branches, the ends of which are provided with drillings to blow gas and particularly air at a large number of points judiciously distributed around the ring. Terminal pipes are very frequently manifolds passing around the rings in the form of an arc of a circle and enclosing part of their perimeter. Frequently, the gas is also blown in the axial direction on the outer ribs of the ring rather than on the ring itself such that the diameter is controlled by these ribs that are more rigid and therefore govern the deformations of the ring itself.

SUMMARY OF THE INVENTION

The assembly that will be described below is characterized in that it is easy to make, despite the large number of pipes that usually have to be used and it is easy to assemble with the ring despite the complications that may arise due to differential thermal expansion at different times during operation of the machine.

Thus in its most general form, the invention relates to a stator ring ventilation assembly composed of branched pipes including feed pipes, distributor and manifolds adjacent to the ring and provided with drillings (i.e., drilled holes) through which gas is blown towards the ring, characterized in that the manifolds are composed of pairs of half-shells having an end plate and a rim surrounding the end plate, the pairs of half-shells being attached by the rims, the distributors including coils forming spacers between the manifolds and provided with ends arranged to be adjusted to openings in the side parts of the end plates.

BRIEF DESCRIPTION OF THE DRAWINGS

Other characteristics and advantages of the invention will become more obvious after reading the description of the following figures.

DESCRIPTION OF THE PREFERRED EMBODIMENTS

Figure 1:
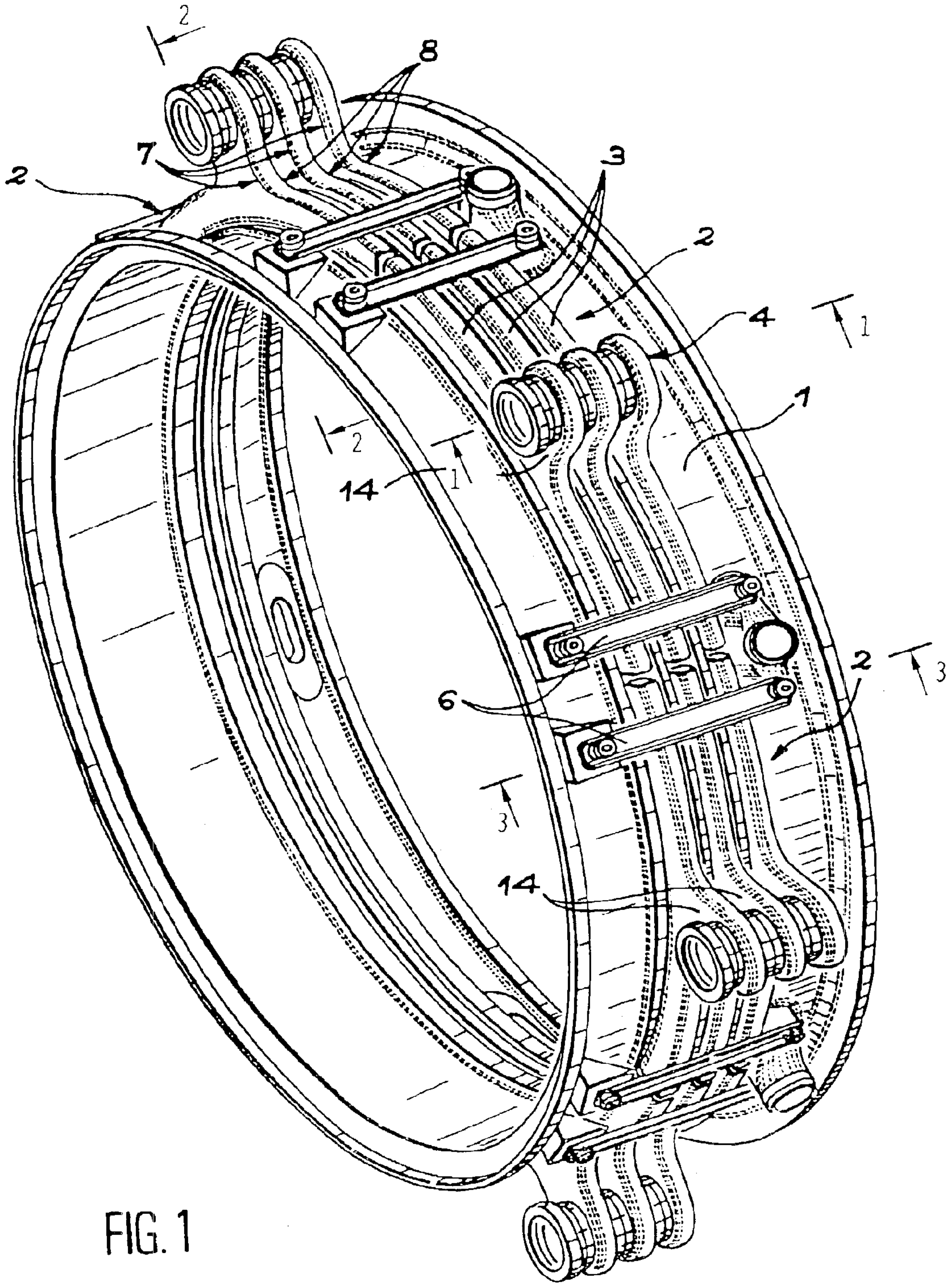
FIG. 1 is an overview of the assembly.

A stator ring 1 is associated with a group of ventilation assemblies 2 conform with the invention, each of which occupies a portion of the circumference of ring 1 and comprises a group of parallel manifolds 3 in the form of an arc of a circle, a distributor 4 that distributes ventilation air between all manifolds 3 and a feed pipe 5 (visible in FIG. 2) adjacent to distributor 4. In general, the feed pipes 5 join together after one or several other distributors, although these distributors are not shown since they are not the subject of this invention, which is more specifically related to the end of the ventilation assemblies 2, in other words their parts that are close to the ring 1 to be ventilated. Note also means of supporting manifolds 3 on ring 1, including rods 6, the ends of which are fixed to ring 1 and each of which covers one end of one of the groups of manifolds 3, crossing over them.

Figure 2:
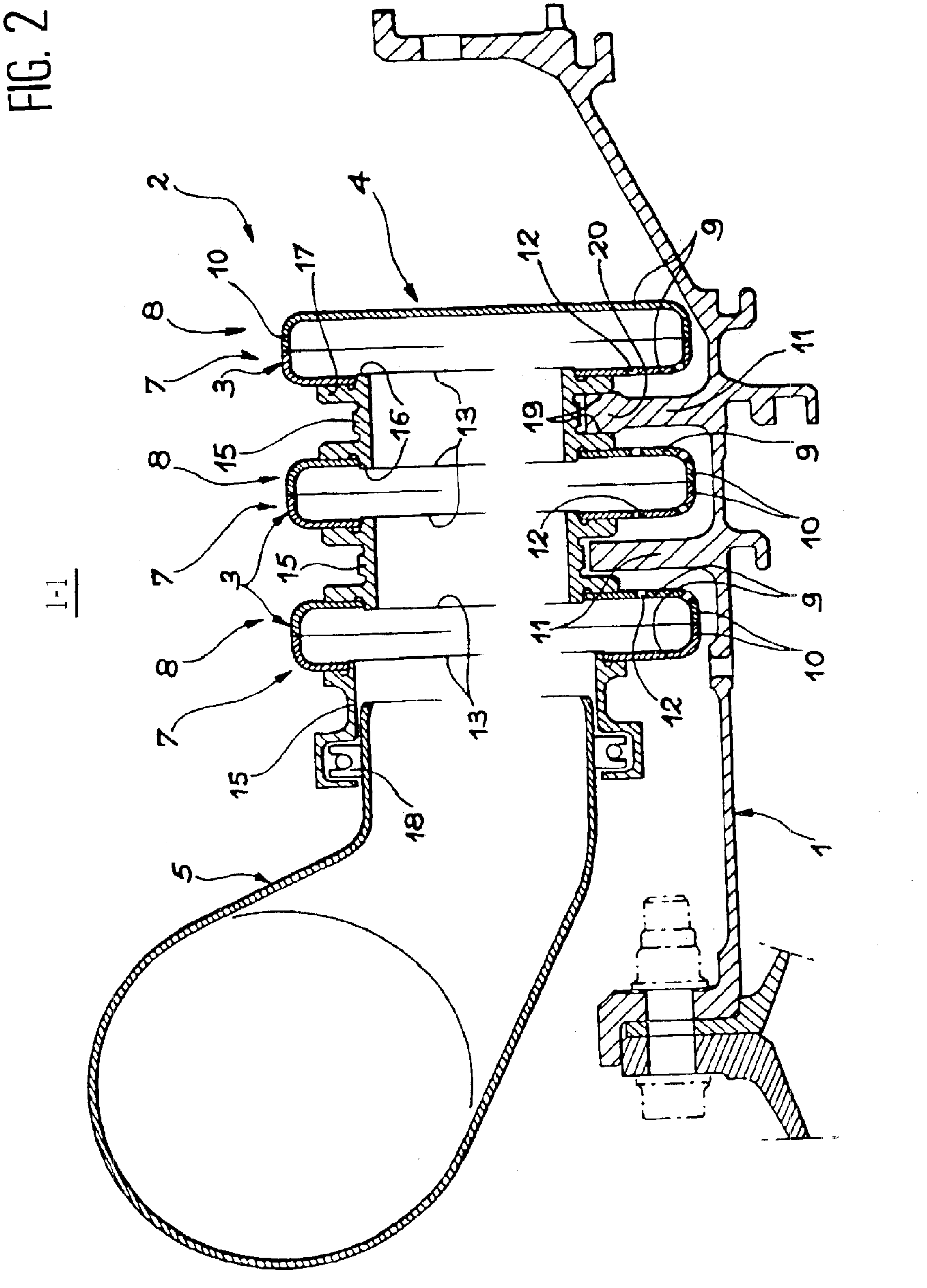
FIG. 2 is a view of a distributor at the branch in a pipe.
Figure 5:
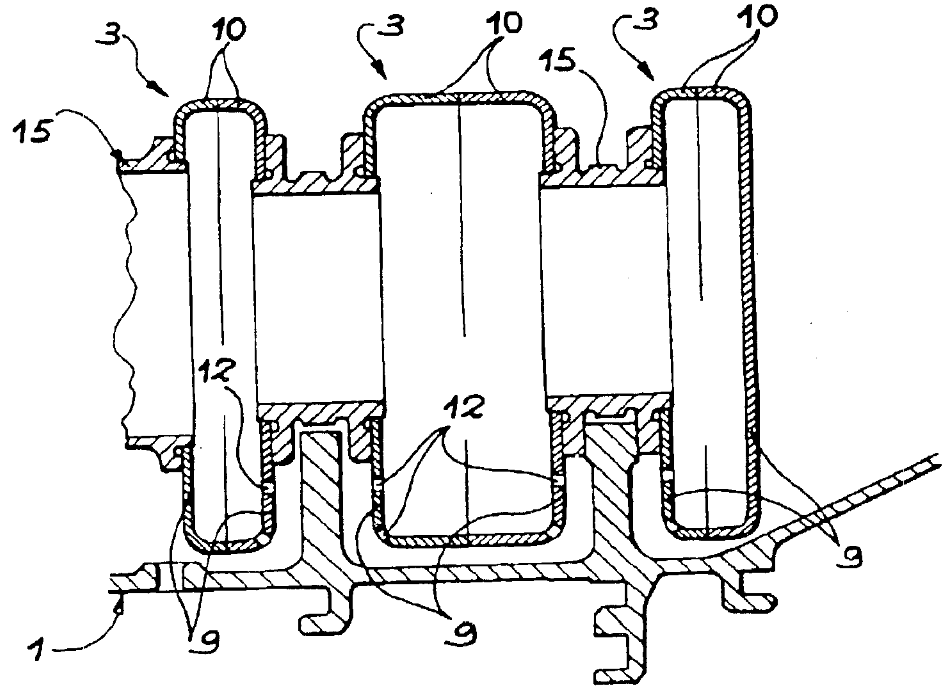
FIG. 5 shows an alternative embodiment of a distributor.

As can also be seen on FIG. 2, each of the manifolds 3 is composed of a left half-shell 7 and a right half-shell 8, each of them being assembled to one of the half-shells. More precisely, the half-shells 7 and 8 of the two types each comprise an end plate 9 that is approximately flat and a rim 10 formed around the end plate 9, the rims 10 of the complementary pairs of half-shells 7 and 8 being along the same line and attached to form a single manifold. The half-shells 7 and 8 may be made by a simple stamping operation and the connections between the rims 10 may be made by welding. This manufacturing method is extremely simple and avoids the need to machine tubes to put them to the required shapes and dimensions, which would probably be much more painstaking. Furthermore, all left half-shells 7 can usually be made using the same tool as the right half-shells 8 that are symmetric to the left half-shells about the joint plane. This overall similarity does not mean that there are not some differences in details. For example, the half-shells 7 and 8 could be made with the different widths of rims 10, for example to give priority to ventilation through the widest manifolds 3. One application example of this process is shown in FIG. 5, in which three manifolds 3 ventilate two ribs 11, the central manifold being placed between the two ribs 11 and ventilating both of them, which justifies why its width is doubled. The blower openings 12 through which air escapes from the manifolds 3 are made before or after stamping the half-shells 7 and 8, only leaving out the end half-shells that are not located in front of any of the ribs 11.

Other wider openings marked reference 13 are made through the sides 14 of the end plates 9, apart from one end half-shell 10 to form the distributor 4. The sides 14 extend sideways from the centers of the end plates 9 in this embodiment and are coplanar with them. The ends of manifolds 3 are closed by continuous plates that are welded to them.

The distributor 4 also comprises coils 15 in the form of a short cylinder acting as spacers between the manifolds 3 and with the feed pipe 5. It is often advantageous if they are similar, but they may be different, particularly for the length. They usually comprise rims 16 that engage into openings 13 in the manifolds 3 to hold them in place, and collars 17 bearing on the manifolds 3 to define the separation of the manifolds. The distributor 4 is complete when the coils 15 have been welded to the manifolds 3. However the distribution pipe 5 is usually separate from the distributor 4 and may slide in the input coil 15, with a seal 18 being added between them.

To conclude with FIG. 2, it will be noted that one of the coils 15 comprises plane and opposite faces 19 enclosing the end 20 (in this case shown enlarged) of the rib 11, the corresponding coil 15 being on top of the rib 11. The reduction in the axial clearance between the coil 15 and the widened portion of the rib 11 contributes to axial positioning of the distributors 4 on the ring 1. This means that the axial position of distributor 4 is defined, and the air gaps between the manifolds 3 and the control rings 11 can be adjusted more precisely, and convection exchanges by air blown over the rings 11 can be better controlled. Note that the second coil overlaps its ring with an axial clearance, to enable relative expansion between boxes 4 and the casing 1 without causing any hyperstatic connection and unwanted constraints.

Figure 3:
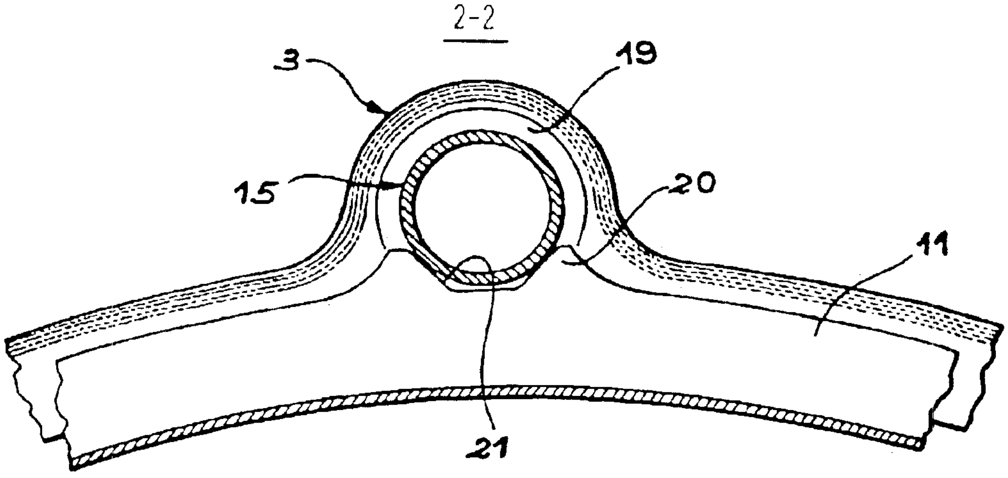
FIG. 3 shows a method of supporting the assembly on the ring.

The composition of the ventilation assembly made of standard elements welded to each other is particularly easy and advantageous. In the rest of this presentation, we will describe the method in which the ventilation assembly 2 is fixed to ring 1. FIG. 3 shows that the end 20 of this rib 11 is provided with a V-notch 21 in which the central cylindrical portion of the coil 15 is supported while self-centering itself, to protect the distributor 4 against radial and tangential movements of ring 1; this enables perfect radial and tangential positioning, and orientation along the engine centerline.

Figure 4:
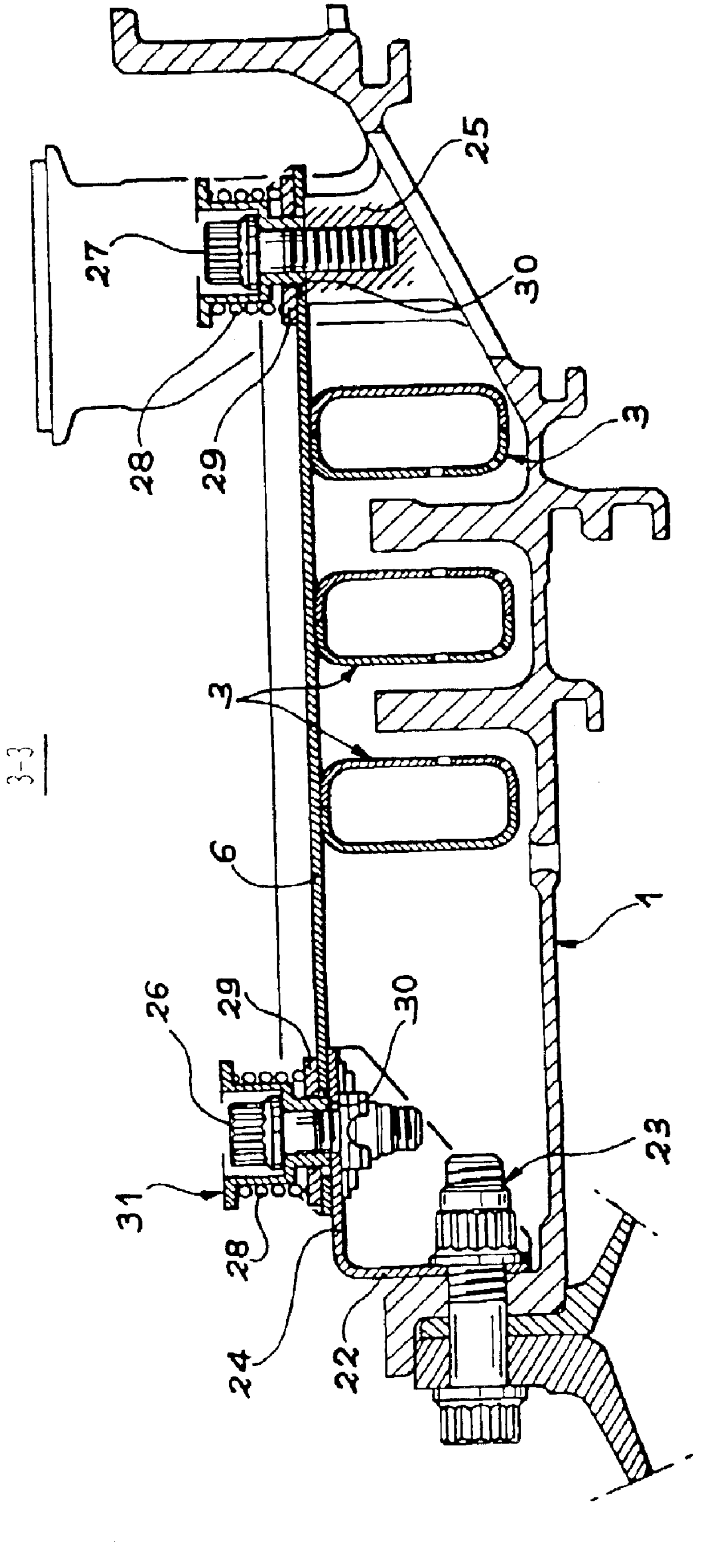
FIG. 4 shows a section through a group of manifolds near their end, and a means of support on the ring.

The rods 6 means will now be described fully with reference to FIG. 4 to show how they provide complementary support for manifolds 3. Brackets 22 are connected to one end of the stator ring 1 through attachment bolts 23 and comprise a flange 24 under end of the rod 6; the other end of the rod is placed on a bossing 25 of the stator ring 1. Bolts 26 and 27 are screwed to the flange 24 and to the bossing 25. They hold the ends of the rod 6 in place on the flange and the bossing, compressing springs 28 bearing on the rod 6 through washers 29. This type of assembly gives better control of the thrust of the rods 6 on the brackets 24 and 25. If this force is excessive, the assembly is rigid and does not allow movements due to temperature. The best control is due to the fact that it is easier to calibrate a compression force of a spring 28 by adjusting the height under the collar of dish 31, than to adjust a tension force in a bolt 26 by tightening it to a defined torque. Furthermore, the rod 6 to which the manifolds 3 are welded is formed with wide openings 30 around bolts 26 and 27, so that it can slide axially tangentially with respect to the stator ring. Therefore this flexible assembly avoids producing excessive internal stresses in the ventilation assembly 2, since the manifolds 3 are able to move above the ring 1 without exerting excessive forces. These relative displacements are usually due to differential thermal expansion. Pressing one of the coils 15 against the end 20 of the corresponding rib 11 also gives some flexibility by allowing the ventilation assembly 2 to move at the ends, while being pulled towards the stator ring 1 and the bottom of the V-notch 21 by the springs 28. This flexibility is valuable since it allows the inevitable differential thermal expansion that occurs with this type of equipment.

What is claimed is:

1. An assembly for ventilating a stator ring, comprising:

branched pipes comprising:

feed pipes, distributors, and a plurality of manifolds configured to be provided adjacent to the stator ring and provided with drilled holes, wherein the distributors connect the feed pipes to the plurality of manifolds;

the plurality of manifolds further comprising pairs of half-shells, each of the half-shells including an end plate having an opening and a rim surrounding the end plate, and the half-shells in each of the pairs being joined to each other at the rims; and the distributors including at least one duct mounted between adjacent manifolds of the plurality of manifolds, said at least one duct having open ends fitted into openings of end plates of said adjacent manifolds and said at least one duct having collars that separate said adjacent manifolds.

2. The assembly according to claim 1 wherein a width of at least one rim of a pair of half-shells of said pairs of half-shells is different than a width of a rim of another pair of half-shells of said pairs of half-shells.

3. The assembly according to claim 1, further comprising:

ribs configured to be provided on the stator ring; and

V-notches that support the ducts.

4. The assembly according to claim 1, further comprising:

rods configured to be mounted on the stator ring, and the rods covering and crossing the plurality of manifolds.

5. The assembly according to claim 4, wherein the rods are configured to be mounted to the stator ring by elastic connections.

6. The assembly according to claim 5, wherein the elastic connections are configured to slide in an axial direction.

7. The assembly according to claim 1, wherein the feed pipes are respectively connected to the plurality of manifolds such that said feed pipes penetrate into the open ends of said plurality of manifolds and seals are disposed between said feed pipes and said open ends of said plurality of manifolds.

8. The assembly according to claim 1, wherein the drilled holes of the plurality of manifolds are configured to be located adjacent to said stator ring.

9. The assembly according to claim 1, wherein the drilled holes are configured to blow gas out towards the stator ring.

10. An assembly comprising:

at least one distributor;

a plurality of manifolds provided with drilled holes, wherein the at least one distributor connects the plurality of manifolds;

the plurality of manifolds further comprising pairs of half-shells, each of the half-shells including an end plate and a rim, the end plate having an opening connected to the at least one distributor, and pairs of half-shells being joined to each other at corresponding rims to form the plurality of manifolds; and the at least one distributor including ducts mounted between adjacent ones manifolds of the plurality of manifolds, at least a duct of said ducts having open ends fitted into openings of end plates of said adjacent manifolds and said at least one duct having collars that separate said adjacent manifolds.

11. The assembly of claim 10, wherein at least a width of a rim of a pair of half-shells of said pairs of half-shells is different than a width of a rim of another pair of half-shells of said pairs of half-shells.

12. The assembly of claim 10, further comprising:

V-notches that support the ducts.

13. The assembly of claim 10, further comprising:

rods configured to be mounted on a stator ring, and the rods covering and crossing the plurality of manifolds.

14. The assembly of claim 13, wherein the rods are configured to be mounted on the stator ring by elastic connections.

15. The assembly of claim 14, wherein the elastic connections are configured to slide in an axial direction.

16. The assembly of claim 10, wherein feed pipes are connected to the plurality of manifolds such that the feed pipes penetrate into the open ends of said plurality of manifolds and seals are disposed between the feed pipes and the open ends of the plurality of manifolds.

17. The assembly of claim 10, wherein the drilled holes are configured to blow gas out towards a stator ring that is encircled by the plurality of manifolds.

* * * * *

UNITED STATES PATENT AND TRADEMARK OFFICE
CERTIFICATE OF CORRECTION

PATENT NO. : 6,896,038 B2
DATED : May 24, 2005
INVENTOR(S) : Jean-Baptiste Arilla et al.

It is certified that error appears in the above-identified patent and that said Letters Patent is hereby corrected as shown below:

Column 2,
Line 32, change “FIG. 5” to -- FIG. 2 --.

Column 3,
Line 22, after “under” insert -- one --.

Signed and Sealed this

Twenty-first Day of February, 2006

JON W. DUDAS
*Director of the United States Patent and Trademark Office*